US008446314B2

(12) United States Patent
Li

(10) Patent No.: US 8,446,314 B2
(45) Date of Patent: May 21, 2013

(54) METHOD AND DEVICE FOR RECEIVING GNSS LOCATION INFORMATION ON A MOBILE COMPUTING DEVICE THROUGH AN AD-HOC NETWORK

(75) Inventor: Xintian Li, Cupertino, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 237 days.

(21) Appl. No.: 13/026,647

(22) Filed: Feb. 14, 2011

(65) Prior Publication Data

US 2012/0206295 A1   Aug. 16, 2012

(51) Int. Cl.
 *G01S 19/48* (2010.01)
(52) U.S. Cl.
 USPC ........................................ 342/357.31

(58) Field of Classification Search
 USPC ..................................................... 342/357.31
 See application file for complete search history.

(56) References Cited

U.S. PATENT DOCUMENTS 7,495,609 B1 *  2/2009  Woo et al. ................ 342/357.64

* cited by examiner

*Primary Examiner* — Harry Liu
(74) *Attorney, Agent, or Firm* — Neugeboren O'Dowd PC

(57) ABSTRACT

A mobile computing device comprising processing components, memory components, and at least one wireless transmitter/receiver. The at least one wireless transmitter/receiver comprises a gps communication device and a network communication device. When at least a portion of gps location information is unable to be received by the gps communication device, the network communication device is configured to receive the gps location information from an additional mobile computing device across an ad-hoc network created between the two mobile computing devices.

20 Claims, 3 Drawing Sheets

METHOD AND DEVICE FOR RECEIVING GNSS LOCATION INFORMATION ON A MOBILE COMPUTING DEVICE THROUGH AN AD-HOC NETWORK

FIELD OF THE INVENTION

The present invention relates to establishing the location of a mobile computing device. In particular, but not by way of limitation, the present invention relates to receiving at least a portion of the information needed to establish a time-to-fix (TTF), also known as TTFF (Time To First Fix), for a gps-enabled mobile computing device from another mobile computing device.

BACKGROUND OF THE INVENTION

"Global Navigation Satellite Systems" (GNSS) is the standard generic term for satellite navigation systems that provide autonomous geo-spatial positioning with global coverage. The United States NAVSTAR Global Positioning System (GPS) is one GNSS system. A GPS mobile computing device is any device that receives Global Positioning System (GPS) signals for the purpose of determining the device's current location on Earth. Assisted GPS, generally abbreviated as A-GPS, aGPS, or AGPS is a system which can, under certain conditions, improve the startup performance, or TTFF, of a GPS mobile computing device. AGPS is used extensively with GPS-capable cellular phones. Non-AGPS "standalone" or "autonomous" devices use radio signals from satellites alone. A-GPS additionally uses network resources such as cellular-network resources to locate and utilize the satellites faster and more accurately in poor signal conditions. However, AGPS is not always available for AGPS-enabled mobile computing devices.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Embodiments are described below in order to improve the TTF for a mobile computing device, when AGPS is unavailable for the mobile computing device, and in some instances when AGPS is available. One embodiment of the invention may be characterized as a mobile computing device. The mobile computing device comprises processing components, memory components, and at least one wireless transmitter/receiver. The at least one wireless transmitter/receiver may comprise a gps communication device and a network communication device. When gps location information is unable to be received by the gps communication device, the network communication device may receive the gps location information from another mobile computing device.

Another embodiment of the invention may be characterized as a method of establishing a location of a first of a plurality of mobile computing devices. One method comprises obtaining a fix between a second of a plurality of mobile computing devices and a gps satellite. The method further comprises establishing a wireless network between the plurality of mobile computing devices, and sending gps fix information from the second of the plurality of mobile computing devices to the first of the plurality of mobile computing devices.

Yet another embodiment of the invention may be characterized as a non-transitory, tangible computer readable storage medium, encoded with processor readable instructions to perform a method of establishing a location of a first mobile computing device. One method comprises establishing wireless communication between the first mobile computing device and the second mobile computing device. The method further comprises receiving gps location information from the second mobile computing device.

And another embodiment of the invention comprises a mobile computing system. The mobile computing system comprises a means for establishing a first communication between a first mobile computing device and a second mobile computing device and a means for establishing a second communication between the second mobile computing device and a gps satellite. The system further comprises a means for providing the first mobile computing device with at least a portion of location information from the second mobile computing device.

BRIEF DESCRIPTION ON THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
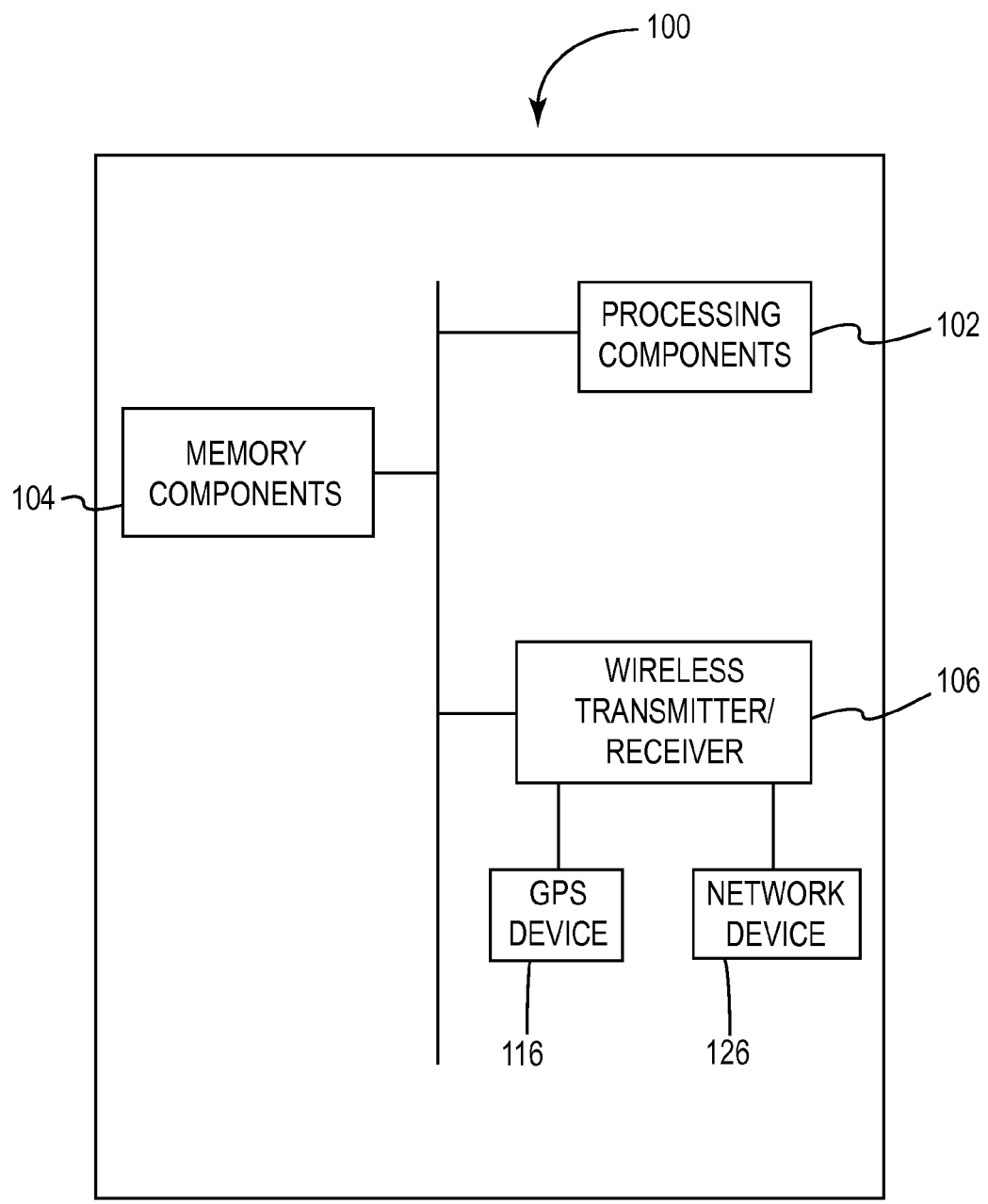
FIG. 1 illustrates a block diagram depicting physical components of an exemplary embodiment of the present invention.

Referring first to FIG. 1, shown is a block diagram depicting the physical components of a mobile computing device 100. One mobile computing device 100 comprises processing components 102, memory components 104, and at least one wireless transmitter/receiver 106. The at least one wireless transmitter/receiver 106 comprises a gps communication device 116 and a network communication device 126. The gps communication device 116 is adapted to communicate with a gps satellite while the network communication device 126 is adapted to communicate with a network device such as, but not limited to, another mobile computing device. Other network devices are contemplated. Furthermore, although FIG. 1 shows the gps communication device 116 and the network communication device 126 as a portion of a single wireless transmitter/receiver 106, the gps communication device 116 and network communication device 126 may also each comprise at least a portion of separate wireless transmitter/receivers 106. It is also contemplated that the at least one wireless transmitter/receiver 106 may also be adapted to communicate in a cellular wireless network.

GPS location information is typically received by the gps communication device 116. GPS location information may comprise TTF information (gps fix information). Other GPS location information and intermediate information comprises a coarse/acquisition code, a precision code, a navigation message, almanac information, data update information, frequency information, and demodulating decoding information. In one embodiment, when gps location information is unable to be received at the gps communication device 116 from a satellite, the network communication device 126 may be configured to receive the gps location information from an additional mobile computing device. The network communication device 126 may also be configured to receive the gps location information when the TTF reaches a threshold set by the user and/or the mobile computing device 100. Although AGPS may often be used to decrease the TTF, in such instances, AGPS may not be available in all instances, or AGPS may not provide a sufficient TTF.

In one example, the gps communication device 116 may attempt to communicate with a gps satellite and obtain a fix with the satellite. Due to poor GPS and cellular signal conditions for the mobile computing device 100, the mobile computing device may either be unable to establish any communication with a satellite, or the TTF may reach a specified threshold. In cases where AGPS is not available for the mobile computing device 100, or, in some cases where AGPS is available, the mobile computing device 100 may connect to a second mobile computing device and obtain gps location information from the second mobile computing device.

Figure 2:
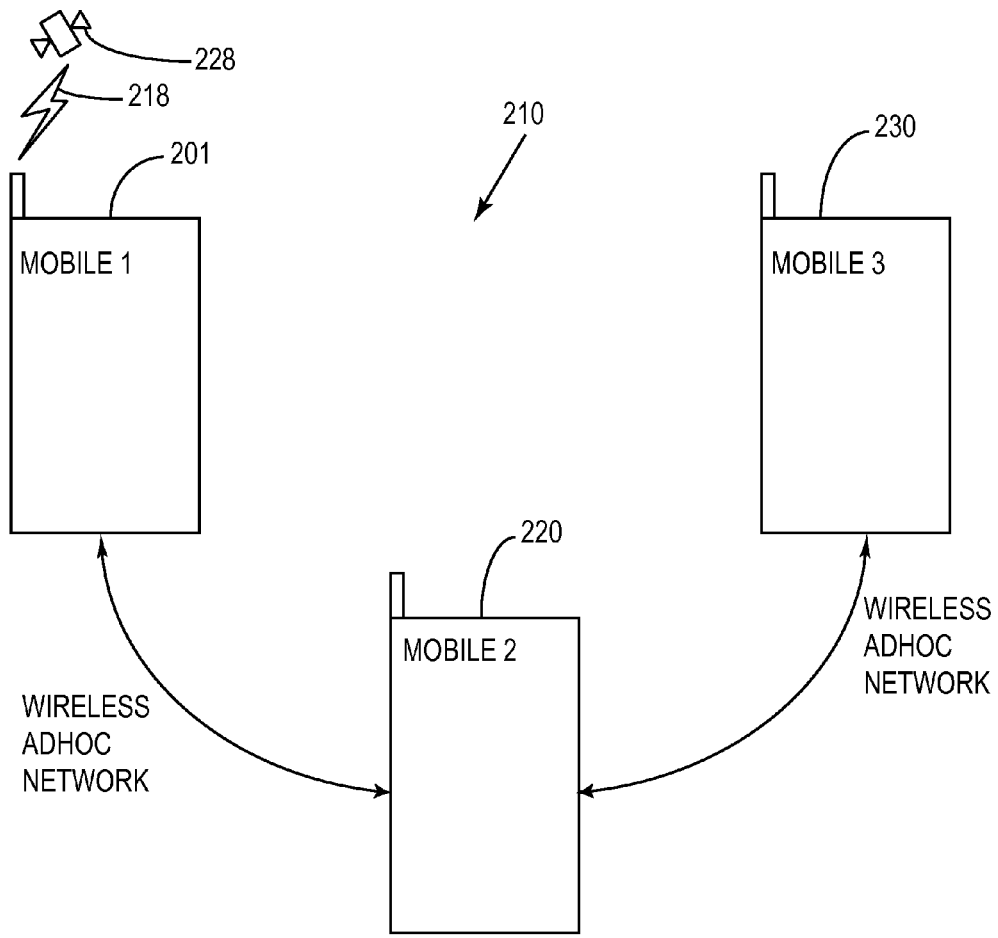
FIG. 2 illustrates the communication between mobile computing devices comprising a network in an exemplary embodiment of the invention.

Seen in FIG. 2 is one version of a network 210 between a mobile computing device 100 that may comprise a first mobile computing device 201, a second mobile computing device 220, and a third mobile computing device 230. The network 210 may comprise an ad-hoc network. For example, the first mobile computing device 201 may initiate establishing an ad-hoc network with the second mobile computing device 220 (and/or other mobile computing devices such as, but not limited to, the third mobile computing device 230) prior to initiating a gps communication 218 with a satellite 228. Alternatively, the first mobile computing device 201 may initiate establishing the network 210 when the TTF reaches a threshold, is unable to establish a fix with the satellite 228, and/or AGPS is unavailable to receive the fix information. The second mobile computing device 220 may also initiate establishing the network 210 during any of these time sequences. The network 210 may also be established while a gps communication 218 is being attempted. The gps communication 218 may also be attempted by the second mobile computing device 220. In one embodiment, the second mobile computing device 220 comprises an additional mobile computing device.

In one embodiment, the first mobile computing device 201 may receive a portion of location information comprising gps satellite demodulation/decoding information or other intermediate information adapted to obtain a fix from one or more additional mobile computing devices. For example, no mobile computing device in the network 210 may have obtained a lock with a satellite 228. In such a case, each mobile computing device in the network 210 may split one or more tasks in obtaining a lock with, for example, three to four of the gps satellites 228. In one embodiment, the task of demodulation/decoding of satellite channel searching may be split amongst the mobile computing devices. Each device may then broadcast the result of that mobile computing device's search within the local ad-hoc network 210. Furthermore, an algorithm on one or more of the mobile computing devices may limit task duplication among the mobile computing devices. The algorithm may also be located on another network device. When one portion of the task is completed by a mobile computing device, the mobile computing device which completed the task may broadcast the completed task information to every other device in the network 210. Each device may listen for a broadcast, may use the completed task information, and may continue its own task. In this manner, the TTFF for each device may be decreased. In other embodiments, the second mobile computing device 220, the third mobile computing device 230, or any other device connected to the network 210 may provide the entirety of the location information such as, but not limited to the gps satellite fix information to the first mobile computing device 201. The location information received from the additional mobile computing device may also comprise a first portion of the gps satellite fix information, and the gps communication device 116 of the first mobile computing device 201 may receive additional gps satellite fix information from the satellite 228 or second mobile computing device 220 or third mobile computing device 230 to complete the fix.

Figure 3:
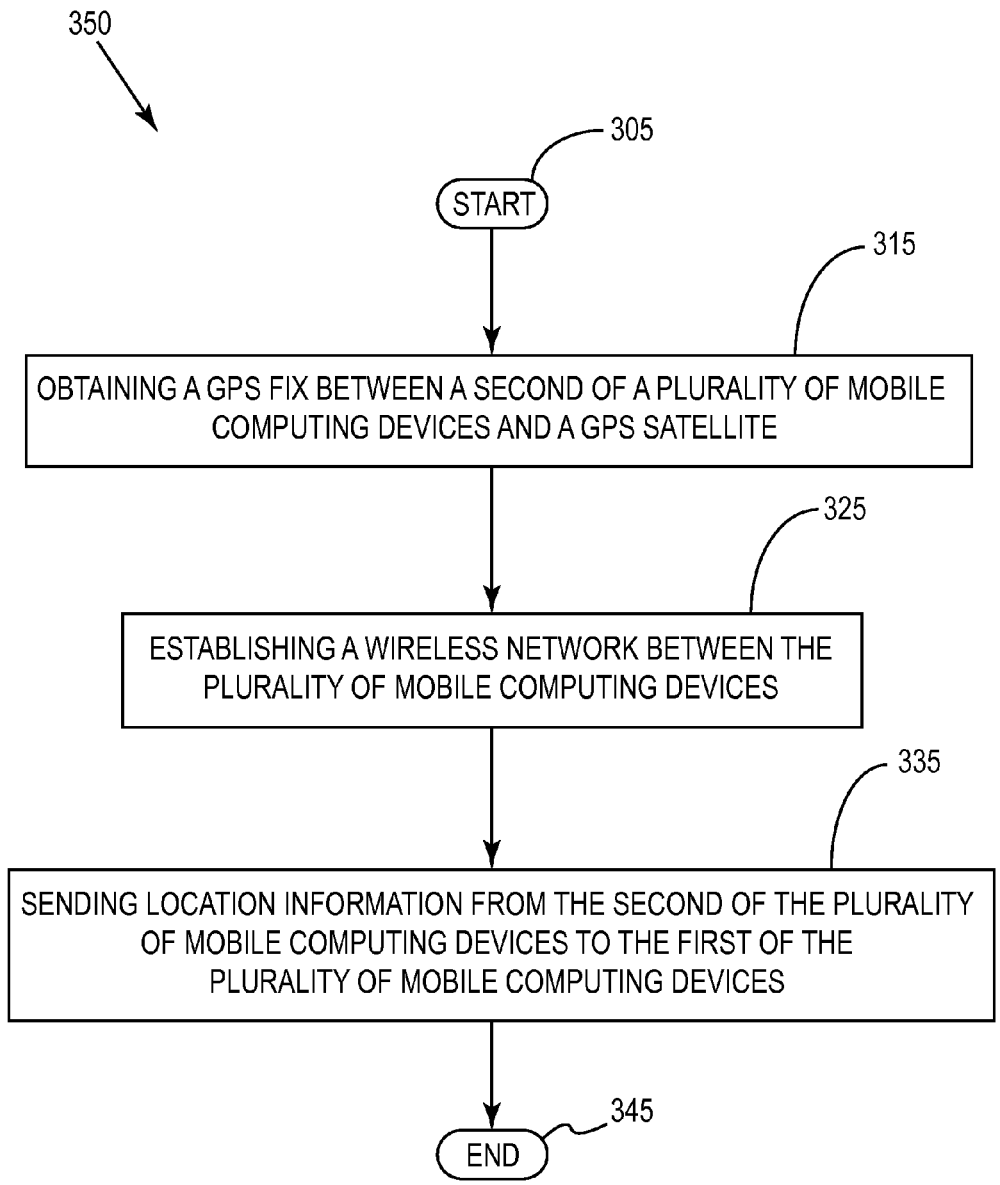
FIG. 3 illustrates a flowchart that depicts a method that may be carried out in connection with the embodiments described herein.

Turning now to FIG. 3, seen is a method 350 of establishing a location of a first of a plurality of mobile computing devices. In one embodiment, the first of a plurality of mobile computing devices comprises the first mobile computing device 201 seen in FIG. 2 and the plurality of mobile computing devices comprise the entirety of the mobile computing devices connected to the network 210 such as, but not limited to, the second mobile computing device 220 and third mobile computing device 230. One method 350 starts at 305 and at 315 comprises obtaining a gps fix between a second of a plurality of mobile computing devices and a gps satellite 228. For example, the second mobile computing device 220 seen in FIG. 2 may obtain a satellite fix. At 325 the method 350 comprises establishing a wireless network between the plurality of mobile computing devices. One network may comprise an ad hoc network such as, but not limited to, the network 210 seen in FIG. 2. At 335 the method 350 comprises sending location information from the second of the plurality of mobile computing devices to the first of the plurality of mobile computing devices. As explained above, the first mobile computing device 201 of FIG. 2 may contact, or be contacted by, the second mobile computing device 220 and be provided at least a portion of gps location information which may comprise gps fix information such as, but not limited to, satellite channel information. This information may comprise additional gps satellite location information or other location information. The gps satellite fix information may decrease the TTF of the first mobile computing device 201.

It is contemplated that the ad hoc network established between the mobile computing devices may be enabled through the close proximity of the devices. For example, the devices in FIG. 2 may be located in the same car and may use Bluetooth to create the ad hoc network. 802.11 may also be used to establish the network 210 between devices that are located within 20 feet of each other. Other distances and network protocols are also contemplated. In one embodiment, a location of the first mobile computing device 201 may be substantially similar to a location of the second mobile computing device 220. Therefore, upon receiving the location information that may comprise gps fix information adapted to enable the first mobile computing device 201 to fix to the gps satellite 228, the first mobile computing device 201 may be able to use information to determine the location of the first mobile computing device 201. Additionally, the first mobile computing device 201 may also receive additional gps fix location information from at least one additional mobile computing device. For example, the third mobile computing device 230 may provide additional information to the first mobile computing device 201 and second mobile computing device 220 that may enable the first mobile computing device 201 to complete a gps fix with the satellite 228.

One embodiment of the invention may also comprise a non-transitory, tangible computer readable storage medium, encoded with processor readable instructions to perform a method of establishing a location of the first mobile computing device 201. The computer readable storage medium may comprise a portion of the memory components 104 and may be accessed by the processing components 102. One method that may be performed upon accessing the non-transitory, tangible computer readable storage medium comprises establishing a wireless communication between the first mobile computing device 201 and the second mobile computing device 220. For example, communication may occur between the first mobile computing device 201 and the second mobile computing device 220 to establish the network 210. GPS location information may then be sent between the second mobile computing device 220 and the first mobile computing device 201. The first mobile computing device 201 and the second mobile computing device 220 may use this information to establish a satellite fix.

In one embodiment, the gps location information comprises at least a portion of information adapted to identify and help complete a connection to a gps satellite 228 channel. The storage medium may further be adapted to sending one or more additional portions of the channel search from the first mobile computing device 201 to one or more mobile computing devices, and receive one or more additional portions of a channel search from the one or more mobile computing devices. The tangible computer readable storage medium may be further adapted to utilize the at least a portion of a channel search and one or more additional portions of the channel search to complete a gps satellite fix.

Another embodiment of the invention comprises a mobile computing system comprising a means for establishing a first communication between a first mobile computing device 201 and a second mobile computing device 220, a means for establishing a second communication between the second mobile computing device 220 and a gps satellite 228, and a means for providing the first mobile computing device 201 with at least a portion of location information from the second mobile computing device 220. The system may further comprise a means for providing at least a portion of the location information from the first mobile computing device 201 to the second mobile computing device 220. Furthermore, the means for providing the first mobile computing device 201 with at least a portion of location information from the second mobile computing device 220 comprises providing the first mobile computing device 201 with at least a portion of gps satellite fix information.

In conclusion, embodiments of the present invention enable a mobile computing device to determine its location by receiving at least a portion of the information needed to establish a time-to-fix (TTF) from another mobile computing device. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device comprising,
    processing components;
    memory components; and
    at least one wireless transmitter/receiver; wherein, the at least one wireless transmitter/receiver comprises,
        a gps communication device adapted to receive gps location information, wherein the gps location information comprises at least a portion of a gps satellite channel search, and
        a network communication device adapted to communicate with an additional mobile computing device, and wherein,
            when at least a portion of the gps location information is not received by the gps communication device, the network communication device is configured to receive the at least a portion of the gps location information from the additional mobile computing device,
            the mobile computing device is adapted to,
                use the at least a portion of the gps location information to establish a location of the mobile computing device, and
                send one or more additional portions of the gps satellite channel search from the mobile computing device to one or more mobile computing devices.

2. The mobile computing device of claim 1 wherein, the network communication device is configured to receive the at least a portion of the gps location information from the additional mobile computing device when at least one of,
    an assisted-gps communication cannot be established with the mobile computing device; and
    poor gps signal conditions are available for the mobile computing device.

3. The mobile computing device of claim 1 wherein, the mobile computing device and the additional mobile computing device are in communication over an ad-hoc network.

4. The mobile computing device of claim 1 wherein, the at least a portion of the gps location information received from the additional mobile computing device comprises one of,
    a portion of a gps satellite fix information; and
    an entirety of a gps satellite fix information.

5. The mobile computing device of claim 4 wherein the gps satellite information comprises at least one of,
    a coarse/acquisition code;
    a precision code;
    a navigation message;
    almanac information;
    data update information;
    frequency information; and
    demodulating and decoding information.

6. The mobile computing device of claim 1 wherein,
    the at least a portion of the gps location information received from the additional mobile computing device comprises a portion of the gps satellite fix information; and
    the gps communication device is configured to receive additional gps satellite fix information.

7. A method of establishing a location of a first of a plurality of mobile computing devices comprising,
    obtaining a gps fix between,
        a second of the plurality of mobile computing devices, and
        a gps satellite;
    establishing a wireless network between the plurality of mobile computing devices;
    sending gps fix information from the second of the plurality of mobile computing devices to the first of the plurality of mobile computing devices when at least a portion of the gps fix information is not received by the first of the plurality of mobile communication devices, wherein the gps fix information comprises at least a portion of a gps satellite channel search;

using the gps fix information received from the second of the plurality of mobile computing devices to determine the location of the first of the plurality of mobile computing devices; and sending one or more additional portions of the gps satellite channel search from the first of the plurality of mobile computing devices to one or more of the plurality of mobile computing devices.

8. The method of claim 7 further comprising,
attempting to establish an assisted-gps communication with the first mobile computing device;
failing to establish the assisted-gps communication with the first mobile communication device; and
using the gps fix information to decrease a time-to-fix of the first of the plurality of mobile computing devices.

9. The method of claim 7 wherein, the location of the first of the plurality of mobile computing devices is substantially similar to a location of the second of the plurality of mobile computing devices.

10. The method of claim 7 wherein, sending gps fix information from the second of the plurality of mobile computing devices to the first of the plurality of mobile computing devices comprises, sending a network broadcast communication from the second of the plurality of mobile computing devices to the plurality of mobile computing devices.

11. The method of claim 7 further comprising, receiving additional gps fix information from at least one additional mobile computing device.

12. A non-transitory, tangible computer readable storage medium, encoded with processor readable instructions to perform a method of establishing a location of a first mobile computing device, the method comprising,
establishing a wireless communication between the first mobile computing device and a second mobile computing device;
receiving gps location information from the second mobile computing device when at least a portion of the gps location information is not received by the first mobile computing device, wherein the gps location information comprises at least a portion of a gps satellite channel search;
sending one or more additional portions of the gps satellite channel search from the first mobile computing device to one or more mobile computing devices; and
using the gps location information to establish the location of the first mobile computing device.

13. The non-transitory, tangible computer readable storage medium of claim 12 wherein, establishing a wireless communication comprises establishing an ad-hoc network.

14. The non-transitory, tangible computer readable storage medium of claim 12 wherein, the gps location information is received from the second mobile computing device when an assisted gps communication is unavailable at the first mobile computing device.

15. The non-transitory, tangible computer readable storage medium of claim 12, wherein,
the method further comprises,
receiving one or more additional portions of a gps satellite channel search from the one or more mobile computing devices prior to using the gps location information to establish the location of the first mobile computing device.

16. The non-transitory, tangible computer readable storage medium of claim 15, further comprising, utilizing the at least a portion of the gps satellite channel search and one or more additional portions of the channel search to complete a gps satellite fix.

17. A mobile computing system comprising,
means for establishing a first communication between a first mobile computing device and a second mobile computing device;
means for establishing a second communication between the second mobile computing device and a gps satellite;
means for providing the first mobile computing device with at least a portion of gps location information from the second mobile computing device when at least a portion of the gps location information is not received by the first mobile computing device, the gps location information comprising at least a portion of a gps satellite channel search;
means for using the gps location information to establish a location of the first mobile computing device; and
means for sending one or more additional portions of the gps satellite channel search from the first mobile computing device to one or more mobile computing devices.

18. The mobile computing system of claim 17 wherein, means for providing the first mobile computing device with at least a portion of location information from the second mobile computing device comprises providing the first mobile computing device with at least a portion of a gps satellite fix information.

19. The mobile computing device of claim 17 wherein, the means for establishing a first communication between a first mobile computing device and a second mobile computing device comprises an ad hoc network.

20. The mobile computing device of claim 17 further comprising, means for determining the location of the second mobile computing device.

* * * * *